No. 739,108. PATENTED SEPT. 15, 1903.
H. RABE.
PROCESS OF PURIFYING GASES CONTAINING SULFUROUS ACIDS.
APPLICATION FILED JAN. 7, 1901.
NO MODEL.
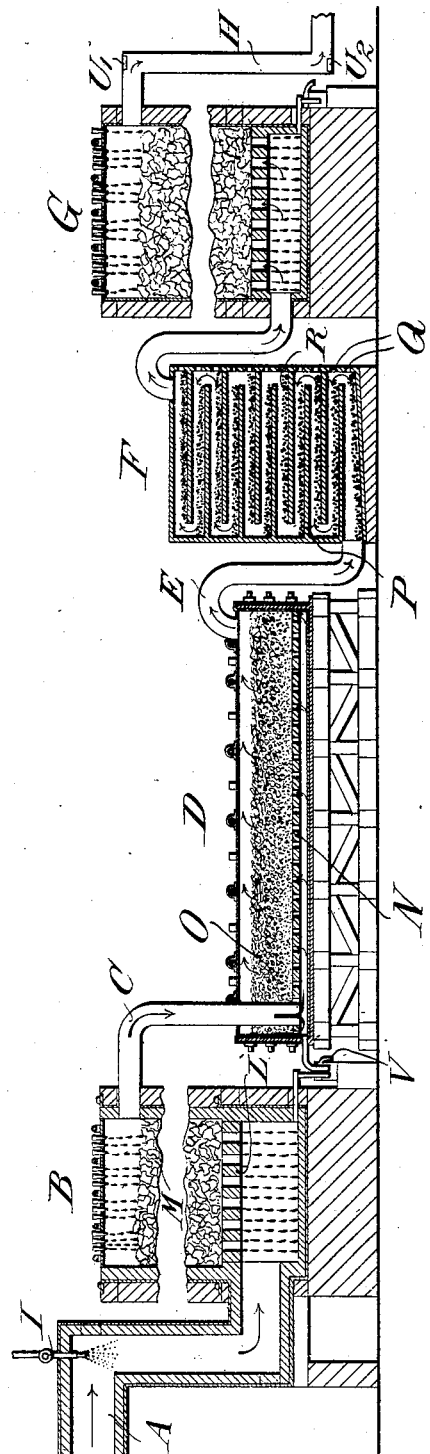
Witnesses
Inventor
Hermann Rabe,
per
Attorney No. 739,108. Patented September 15, 1903.

UNITED STATES PATENT OFFICE.

HERMANN RABE, OF ST. PETERSBURG, RUSSIA.

PROCESS OF PURIFYING GASES CONTAINING SULFUROUS ACID.

SPECIFICATION forming part of Letters Patent No. 739,108, dated September 15, 1903.

Application filed January 7, 1901. Serial No. 42,439. (No specimens.)

*To all whom it may concern:*

Be it known that I, HERMANN RABE, chemist, a subject of the King of Prussia, German Emperor, residing at 15 Torgowaja, Quartier 42, St. Petersburg, Russia, have invented certain new and useful Improvements in Processes of Purifying Gases Containing Sulfurous Acid for Winkler's Contact Process, of which the following is a specification.

As is well known, the gases for the Winkler contact process, if not sufficiently pure, gradually exert an unfavorable influence on the contact substance and render its frequent regeneration absolutely necessary. Attempts have already been made to remove the injurious matter by indirect cooling in lead coolers, drying in columns through which 60° Baumé sulfuric acid is allowed to trickle, and combustion of any combustible matter which may be present. The gases have also been indirectly cooled in two separate stages—viz., by air-cooling in a long system of pipes and by water-cooling in coolers—diluted, the sulfuric acid separating from the gases to 10° to 40° Baumé, and effected the complete elimination of dusty, nebulous, and gaseous by constituents, such as sulfuric acid, arsenic, phosphor, mercury, and their compounds, attempted by means of intense washing with water or sulfuric acid, to which, for the purpose of increasing the purifying power, bisulfite or like chemicals may be added. Attempts have also been made to remove the dust by means of filters, without, however, obtaining any superior results, since rapid choking and obstruction of the draft have appeared to be inseparably connected with their use.

According to the present process I diminish the temperature of the gases by direct contact with the cooling liquid, eliminate the dusty and nebulous materials contained in them by a peculiar process of filtration until the gases in dry condition leave no traces on the disks of a Tyndall's apparatus, remove next all gaseous by constituents not found to be uninjurious by means of suitable reagents, and finally dry the gases thoroughly. The gases are cooled in two stages. First, a preliminary cooling is effected by introducing water of as pure a nature as possible—*e. g.*, water of condensation—by means of sprinklers or in other manner into the conduit having a ceramic protecting lining to a temperature at which condensation of the fluid constituents cannot take place. Instead of water sulfuric acid may also be introduced, and then the cooling proper is undertaken to temperatures of from 100° centigrade to that of air by direct contact with dilute or concentrated sulfuric acid trickling down through cooling-towers built in the manner of a Glover's tower. The preliminary cooling, which has the special purpose of relieving the cooling-towers, may be discarded. This method of cooling through direct contact with the cooling media operates extremely intensively and requires but small outlay in apparatus. The gases give up the greater part of their dust without its being able to cause stoppages direct to the cooling-acid, which if the tower is not too full and the flow of the liquid trickling down regular will carry it off with it without any stoppage in the tower taking place. The cooling-acid may be of strength up to 60° Baumé without having an obstructing action on the impurities separated out, and since the metal walls are protected by ceramic material the action of arseniureted and other hydrogen formations have not to be feared. Thus the gases leaving the cooling apparati are as dry as is possible. The cooled gases, for the purpose of completely removing any solid or fluid constituents contained in them, are led through filters. These consist of several layers of filtering material— first, a filtering material of, say, ten millimeter grains, then of, say, five, &c., and firstly of about one millimeter. To avoid excessive loss by friction, the filter should present as large a surface as possible for the entrance of gas. Since, however, only the upper surface of the filtering-grains comes into consideration, the depth of the filtering layer can be correspondingly decreased. Furthermore, the gases must be conducted into the filters in that direction in which the separating fluid condensate does not act to impede the current of gas therefore either from above downward or also vice versa should the velocity be diminished as far as possible. Lastly, arrangements must be made for disturbing at intervals the slimy deposit or crust (which is sometimes considerable) at the surface of the filters where the gas enters before the draft is sensibly affected. This may be done by breaking or stirring it up by means of a stream of fluid. Filters constructed in this manner with a quite small difference of pressure—e.g., two-millimeter head of water—effect absolutely continuous and complete separation of all solid and fluid constituents from the gases. For the purpose in view, chamotte, coke, quartz, and for the finest layer fibrous material—such as asbestos, glass-wool, &c.—may be employed as filtering medium. The fibrous material in loose condition must be arranged in such manner on a series of sieves separated from each other that every particle of gas is compelled to pass through the whole of the layers. As final reaction for the absence of nebulous and dusty constituents I employ the glass disks of the Tyndall testing apparatus. Should they remain permanently absolutely bright, naturally on the supposition that the glass is acid resistant and the gases themselves dry, it is a proof that the gases contain not the least trace of dust. This test is preferably to be made with the gases after passing through the gas-drying apparatus. After separation of the dusty and nebulous constituents until there is proof of the indifference all gaseous substances which may be contained in the sulfurous-acid and oxygen-gas mixture must be removed, even though there may only be traces present. As passive are at present considered, in addition to anhydrous sulfuric acid, only nitrogen and the other gases besides nitrogen contained in the atmosphere, as also carbonic acid. All other gases must be removed by treatment with the reagents adapted for the purpose. In many calcination-gases I have found traces of hydrochloric acid, which in time precipitate iron on the contact substance chiefly in the form of iron glance. To remove these traces of hydrochloric acid is a very difficult manner, as is well known from the hydrochloric-acid condensation. The problem, however, is readily solved by treating the gases with bisulfites either in concentrated solution or solid form. Naturally hydrobromic acid, hydric iodid, and hydric fluorid can also be removed by means of bisulfites. After removal of all impurities the gases are dried in well-known manner and conducted to the contact process.

The present process can also be employed for gases of other origin containing sulfurous acid.

A plant for carrying out the present process is shown in the annexed drawing.

The figure shows a vertical section of the series of apparatus

A is the iron conduit, lined with chamotte, into which, by means of a suitable jet, just so much water or sulfuric acid is introduced as is completely evaporated. In this manner the temperature of the calcination-gases is considerably reduced and the main cooling operation in the column B greatly facilitated. The latter is built in the manner of a Glover tower and its bottom and sides lined with an acid-resistant ceramic material.

L is the grating on which the charge M lies, through which percolates cold sulfuric acid, trickling down as uniformly as possible from the roof of the tower. The acid, warmed by the heat of the gases, flows off through the trap V to the cooler. The cooled still impure gases reach the filter D through the pipe C, which filter in the apparatus shown they pass through from below upward. The filter D consists of a hollow lead-lined wooden box having a grating N, on which the filtering material O is distributed. The coarsest filtering substance lies at the bottom, the finest at the top, so that the coarser impurities are deposited upon the coarser material and the finer upon the finer material. Should any obstruction occur, the accumulated impurities must be washed down with acid. The acid condensing in the filter is conducted off through an acid trap. After passing through the filter the gases are conducted, with the object of removing any gaseous impurities which may still be present, into the absorption apparati arranged for this purpose, thence through pipe E into the apparatus F, in which on alternately projecting trays P bisulfite R is distributed for the purpose of removing the traces of hydrochloric acid. The apertures Q admit of the bisulfite being from time to time agitated or conducted downward. After the drying operation in the tower G, in well-known manner, the gas reaches the glass disks U and U' of the Tyndall apparatus H for constant testing for absolute clearness of the gas.

In place of the apparatus described any other plant suitable for the process may be employed.

Having thus described my invention, what I claim as new, and desire to secure by Letters Patent, is—

1. The process of purifying gases containing sulfurous acid for Winkler's contact process to such degree that they satisfy the test that in a dry condition after passing a glass disk during a long period they leave no traces thereon which process consists in passing the gases through a cooling-tower coming therein in direct contact with such an amount of sulfuric acid of any desired strength that the gases thereby are finally cooled to a temperature below 100° centigrade and which process further consists in passing the gases through wide and thin layers of filtering material while removing periodically the slimy deposits from the filtering material.

2. The process of purifying gases containing sulfurous acid for Winkler's contact process to such degree that they satisfy the test that in a dry condition after passing a glass disk during a long period they leave no traces thereon which process consists in introducing such a quantity of a liquid into the hot gases that the gases by the complete vaporization of the liquid partially are cooled to a temperature at which there is not yet a deposit of condensates as set forth and in passing the gases through a cooling-tower coming therein in direct contact with such an amount of sulfuric acid of any desired strength that the gases thereby are finally cooled to a temperature below 100° centigrade and which process further consists in passing the gases through wide and thin layers of filtering material while removing periodically the slimy deposits from the filtering material.

3. The process of purifying gases containing sulfurous acid for Winkler's contact process to such degree that they satisfy the test that in a dry condition after passing a glass disk during a long period they leave no traces thereon which process consists in passing the gases through a cooling-tower coming therein in direct contact with such an amount of sulfuric acid of any desired strength that the gases thereby are finally cooled to a temperature below 100° centigrade and which process further consists in passing the gases through wide and thin layers of filtering material while removing periodically the slimy deposits from the filtering material in combination with a chemical purification of the gases consisting in separating from the gases thus mechanically purified any gaseous not passive constituents by means of reagents capable of binding them.

4. The process of purifying gases containing sulfurous acid for Winkler's contact process to such degree that they satisfy the test that in a dry condition after passing a glass disk during a long period they leave no traces thereon which process consists in introducing such a quantity of a liquid into the hot gases that the gases by the complete vaporization of the liquid partially are cooled to a temperature at which there is not yet a deposit of condensates as set forth and in passing the gases through a cooling-tower coming therein in direct contact with such an amount of sulfuric acid of any desired strength that the gases thereby are finally cooled to a temperature below 100° centigrade and which process further consists in passing the gases through wide and thin layers of filtering material while removing periodically the slimy deposits from the filtering material, in combination with a chemical purification of the gases consisting in separating from the gases thus mechanically purified any gaseous not passive constituents by means of reagents capable of binding them.

Signed at Berlin this 22d day of December, 1900.

HERMANN RABE.

Witnesses:
  HENRY HASPER,
  WOLDEMAR HAUPT.